United States Patent
Manchanda et al.

(10) Patent No.: US 11,947,632 B2
(45) Date of Patent: Apr. 2, 2024

(54) TRAINING A CLASSIFICATION MODEL USING LABELED TRAINING DATA THAT DOES NOT OVERLAP WITH TARGET CLASSIFICATIONS FOR THE CLASSIFICATION MODEL

(71) Applicant: Maplebear Inc., San Francisco, CA (US)

(72) Inventors: Saurav Manchanda, Minneapolis, MN (US); Krishnakumar Subramanian, Cupertino, CA (US); Haixun Wang, Palo Alto, CA (US); Min Xie, Santa Clara, CA (US)

(73) Assignee: Maplebear Inc., San Francisco, CA (US)

( * ) Notice: Subject to any disclaimer, the term of this patent is extended or adjusted under 35 U.S.C. 154(b) by 301 days.

(21) Appl. No.: 17/405,011

(22) Filed: Aug. 17, 2021

(65) Prior Publication Data
US 2023/0055760 A1 Feb. 23, 2023

(51) Int. Cl.
*G06F 18/2411* (2023.01)
*G06F 18/214* (2023.01)
(Continued)

(52) U.S. Cl.
CPC ........ *G06F 18/2411* (2023.01); *G06F 18/214* (2023.01); *G06F 18/22* (2023.01); *G06N 3/084* (2013.01)

(58) Field of Classification Search
CPC .... G06F 18/2411; G06F 18/214; G06F 18/22; G06F 18/241; G06F 18/24; G06F 18/253; G06F 18/2148; G06F 16/5854; G06F 16/35; G06F 18/2414; G06F 18/2415; G06F 16/583; G06F 16/20; G06F 16/3329; G06F 40/30; G06F 18/2113; G06F 2009/45595; G06F 18/2193; G06F 21/552; G06F 21/554; G06F 30/27; G06F 40/279; G06F 8/35; G06F 16/243; G06F 16/24578; G06F 16/3331; G06F 16/334; G06F 16/3332; G06F 16/906; G06F 16/75; G06F 18/217; G06F 18/24323; G06F 18/254; G06F 18/256; G06F 18/285; G06F 2218/12;
(Continued)

(56) References Cited

U.S. PATENT DOCUMENTS

2017/0252924 A1* 9/2017 Vijayanarasimhan ................ G05B 13/027
2019/0005069 A1* 1/2019 Filgueiras de Araujo ................ G06V 10/757
(Continued)

*Primary Examiner* — Nimesh Patel
(74) *Attorney, Agent, or Firm* — Fenwick & West LLP

(57) ABSTRACT

An online concierge system trains a classification model as a domain adversarial neural network from training data labeled with source classes from a source domain that do not overlap with target classes from a target domain output by the classification model. The online concierge system maps one or more source classes to a target class. The classification model extracts features from an image, classifies whether an image is from the source domain or the target domain, and predicts a target class for an image from the extracted features. The classification model includes a gradient reversal layer between feature extraction layers and the domain classifier that is used during training, so the feature extraction layers extract domain invariant features from an image.

13 Claims, 5 Drawing Sheets

(51) Int. Cl.
*G06F 18/22* (2023.01)
*G06N 3/084* (2023.01)

(58) Field of Classification Search
CPC .... G06F 18/213; G06F 18/23; G06F 2111/06; G06N 3/084; G06N 3/09; G06N 3/096; G06N 3/045; G06N 3/08; G06N 20/00; G06N 3/044; G06N 3/048; G06N 20/10; G06N 3/082; G06N 3/04; G06N 3/049; G06N 3/0464; G06N 20/20; G06N 3/0475; G06N 3/006; G06N 3/02; G06N 3/061; G06N 3/042; G06N 5/01; G06N 7/01; G06N 3/047; G06N 3/088; G06N 5/00; G06V 10/82; G06V 10/774; G06V 10/454; G06V 10/764; G06V 20/10; G06V 30/19173; G06V 30/274; G06V 10/40; G06V 2201/03; G06V 10/25; G06V 10/762; G06V 20/698; G06V 2201/06; G06V 40/161; G06V 40/193; G06V 10/776; G06V 40/168; G06V 40/172; G06V 40/20; G06V 10/7715; G06V 20/52; G06V 10/225; G06V 20/40; G06V 20/64; G06V 40/16; G06V 40/18; G06V 40/197; G06T 2207/20081; G06T 2207/20084; G06T 7/0012; G06T 7/11; G06T 5/002; G06T 2207/10004; G06T 3/4046; G06T 2207/30004; G06T 2207/10016; G06T 7/174; G06T 9/002; G06T 2207/10024; G06T 7/73; G06T 7/0002; G06T 7/246; G06T 7/579

See application file for complete search history.

(56) References Cited

U.S. PATENT DOCUMENTS

| | | | |
|---|---|---|---|
| 2019/0138811 A1* | 5/2019 | Sohn | G06V 20/41 |
| 2021/0216865 A1* | 7/2021 | Versace | G06N 3/045 |
| 2022/0198339 A1* | 6/2022 | Zhao | G06F 18/214 |

* cited by examiner

TRAINING A CLASSIFICATION MODEL USING LABELED TRAINING DATA THAT DOES NOT OVERLAP WITH TARGET CLASSIFICATIONS FOR THE CLASSIFICATION MODEL

BACKGROUND

This disclosure relates generally to training a classification model, and more specifically to training the classification model using existing training data with labels that do not overlap with classes to be output by the classification model.

Many online systems employ one or more machine learning models to analyze data. Different online systems may use different machine learning models for different types of analysis or to analyze different types of data. However, obtaining labeled training data for training one or more machine learning models is difficult for many online concierge systems. While data can be manually labeled to form training data for a machine learning model, creation of manually labeled training data is tedious and expensive. Additionally, many manually labeled training data sets are generally unable to be reused for different types of analysis if the distribution of data used to generate the training data changes over time.

SUMMARY

An online concierge system, or other online system, obtains training data from a source domain that includes a set of examples, with a label corresponding to a class in the source domain applied to each example of the set of training data. In various embodiments, the training data includes a plurality of images and a label identifying a class in the source domain applied to each image. Hence, the examples of the training data comprise images each labeled with a corresponding class from the source domain. In various embodiments, the label applied to an example of the training data is text data, such as a name or a description of a class.

The online concierge system generates a source embedding for each class of the source domain, creating a semantic representation of each class of the source domain. In some embodiments, the online concierge system generates an embedding for each class of the source domain. The source embedding for a class of the source domain represents the class in a multidimensional space in various embodiments.

Additionally, the online concierge system obtains a description of each class of a target domain, where the classes in the target domain are different from the classes of the source domain. In various embodiments, the classes of target domain do not overlap with the classes of the source domain. The target domain includes the classes to be output by a trained classification model subsequently applied by the online concierge system. A description of a class of the target domain is a textual description of the class or other text describing the class in various embodiments. For example, a description of a class in the target domain comprises a set of keywords corresponding to the class in the target domain.

For each class in the target domain, the online concierge system generates a target embedding from the description of a class in the target domain from the description of the class in the target domain. The target embedding for the class in the target domain represents the target class in a multidimensional space in various embodiments. The target embeddings for classes in the target domain and the source embeddings for the classes of the source domain, are in a common latent space (e.g., the source embeddings and the target embeddings have an equal number of dimensions).

For each class in the target domain, the online concierge system selects a corresponding set of classes in the source domain based on similarities between the class in the target domain and classes in the source domain. In various embodiments, the online concierge system determines a measure of similarity between a target embedding for the class in the target domain and source embeddings and selects classes of the source domain based on the measures of similarities. For example, the online concierge system selects classes in the source domain having at least a threshold measure of similarity to the class in the target domain. As another example, the online concierge system ranks classes in the source domain based on corresponding measures of similarity to the class of the target domain and selects classes in the source domain having at least a threshold position in the ranking. Example measures of similarity between a source embedding and a target embedding include a cosine similarity between the source embedding and the target embedding, a Euclidian distance between the source embedding and the target embedding, a dot product between the source embedding and the target embedding, or any other suitable metric. This allows the online concierge system to select a set of classes in the source domain that correspond to a class in the target domain.

From the training data including examples labeled with a class from the source domain, the online concierge system selects examples from the training data having labels matching a class of the source domain included in a selected set of classes of the source domain. Using the selected set of classes of the source domain allows the examples selected from the training data to have labels that correspond to a class in the target domain. In various embodiments, the online concierge system identifies each class of the target domain and selects examples of the training data having a class of the source domain matching a set of classes in the source domain selected as corresponding to an identified class of the target domain, allowing the online concierge system to select examples of the training data corresponding to different classes of the target domain.

The online concierge system generates a source domain training set that includes the examples selected from the training data that have a class of the source domain matching at least one or the set of classes in the source domain corresponding to a class in the target domain. An example of the source domain training set includes the example of the training data from the source domain with a class label applied that identifies a class in the target domain corresponding to the class of the example in the source domain and a domain label indicating a domain from which the example was obtained. Hence, the source domain training set leverages the labels for examples indicating a class in the source domain for an example and the correspondences between classes in the target domain and classes in the source domain to generate examples of content, such as images, labeled with a corresponding class in the target domain and with a domain from which the example was obtained. Hence, the selection of classes of the source domain corresponding to classes of the target domain allows the online concierge system to leverage existing training data that labels images or other content with a class in the source domain into the source domain training set that applies class labels identifying classes in the target domain for various examples of training data from the source domain.

However, examples of the source domain training set, which are examples selected from the training data with labels in the source domain corresponding to a label in the target domain may be insufficient to generalize to content from the target domain. For example, the training data from the source dimension includes various images and other images are included in the target domain, and differences in characteristics of the selected images and characteristics of images in the target domain may limit accuracy of a classification model for the target domain trained from the selected examples from the training set. The online concierge system trains the classification model as a domain adaptive network by applying the classification model to the examples in the target domain training data to allow the classification model to allow characteristics from the labeled examples selected from the target domain training data to be adaptable to content from the target domain. In other embodiments, the online concierge system trains the classification model using any suitable method or architecture to minimize a distributional distance between examples from the source domain and examples from the target domain.

Additionally, the online concierge system obtains a second training set including additional examples from the target domain and from the source domain with a domain label applied to each additional example indicating the domain from which the additional example or was obtained. Hence, the domain label indicates whether an additional example of the second training set is from the source domain or is from the target domain. The classification model is applied to an additional example of the second training set, where a feature extractor extracts features of the additional example through a neural network or other machine learning model. In various embodiments, a feature vector describing various characteristics or attributes of the additional example is extracted by the neural network or other machine learning model. Features extracted from an additional example are input to a domain classifier that is coupled to the feature extractor through a gradient reversal layer. In some embodiments, the domain classifier outputs a predicted domain for the additional example that indicates whether the additional example is from the source domain or is from the target domain. Similarly, features extracted from the additional example are also input to a class predictor which outputs a predicted class of the target domain for the additional example.

For an additional example of the second training set, application of the classification model to the additional example results in a predicted domain for the additional example of the second training set. For the domain classifier of the classification model, the online concierge system determines an error term from a difference between the domain label applied to the additional example of the second training set and the predicted domain of the additional example of the second training set. The error term may be generated through any suitable loss function, or combination of loss functions, in various embodiments. For example, the loss function is a cross entropy loss between a predicted domain of the additional example of the second training set and a domain label applied to the corresponding additional example of the second training set. However, in other embodiments, any loss function or combination of loss functions, may be applied to the predicted domain of the additional example of the second training set to the corresponding domain label of the additional example of the second training set to generate the error term. Such a loss term allows the classification model to be trained to minimize a distributional distance between the additional examples from the source domain and from the target domain.

The online concierge system backpropagates the one or more error terms from the domain label applied to an example of the second training set and the predicted domain of the example of the second training set through layers of a network comprising the domain classifier and comprising the feature extractor. Backpropagation of the error term from a layer of the network comprising domain classifier to a layer of the network comprising the feature extractor through the gradient reversal layer multiplies the error term by a negative constant (e.g., negative one), so a negative of the error term is backpropagated through layers of the feature extractor. One or more parameters of the network comprising the domain classifier and comprising the feature extractor are modified through any suitable technique from the backpropagation of the one or more error terms, and of one or more error terms multiplied by the negative constant, through the layers of the network comprising the domain classifier and comprising the feature extractor. For example, weights between nodes of the network comprising the feature extractor or between nodes of the network comprising the domain classifier, such as nodes in different layers of the network comprising the feature extractor or comprising the domain classifier, are modified to reduce the one or more error terms. The backpropagation of the one or more error terms is repeated by the online concierge system until the one or more loss functions satisfy one or more criteria. For example, the one or more criteria specify conditions for when the backpropagation of the one or more error terms through the layers of the network is stopped. In some embodiments, the online concierge system uses gradient descent or any other suitable process to minimize the one or more error terms in various embodiments.

Similarly, for examples of the source domain training set, application of the classification model to the example of the source domain training set results in a predicted domain for the example of source domain training set and a predicted class of the target domain for the example. For the class predictor of the classification model, the online concierge system determines an error term from a difference between the class label applied to the example of the source domain training set and the predicted class of the target domain of the example of the source domain training set. As further described above, an example of the source domain training set is labeled with one or more classes of the source domain, from which a label identifying a corresponding class in the target domain is determined and applied to the example of the source domain training set. The error term may be generated through any suitable loss function, or combination of loss functions, in various embodiments. For example, the loss function is a cross entropy loss between a predicted class of the target domain for the example of the source domain training set and a class label applied to the corresponding example of the source domain training set. However, in other embodiments, any loss function or combination of loss functions, may be applied to the predicted class of the target domain for the example of the source domain training set and the class label applied to the corresponding example of the source domain training set to generate the error term.

The online concierge system backpropagates the one or more error terms from the class label applied to an example of the source domain training set and the predicted class of the target domain for the example of the source domain training set through layers of the network comprising the class predictor and comprising the feature extractor. One or more parameters of the network comprising the class predictor and comprising the feature extractor are modified through any suitable technique from the backpropagation of the one or more error terms through the layers of the network comprising the class predictor and comprising the feature extractor. For example, weights between nodes of the network comprising the feature extractor or between nodes of the network comprising the class predictor, such as nodes in different layers of the network comprising the feature extractor or comprising the class predictor, are modified to reduce the one or more error terms. The backpropagation of the one or more error terms is repeated by the online concierge system until the one or more loss functions satisfy one or more criteria. For example, the one or more criteria specify conditions for when the backpropagation of the one or more error terms through the layers of the network comprising the feature extractor and through layers of the network comprising the class predictor is stopped. In some embodiments, the online concierge system uses gradient descent or any other suitable process to minimize the one or more error terms in various embodiments.

In response to the one or more loss functions satisfying the one or more criteria and the online concierge system stopping the backpropagation of the one or more error terms, the online concierge system stores the set of parameters for the layers of the network comprising the feature extractor and the class predictor as the classification model. For example, the online concierge system stores the weights of connections between nodes in the networks comprising the feature extractor and the class predictor as parameters of the classification model in a non-transitory computer readable storage medium. Hence, training of the classification model allows the online concierge system to generate and to store a neural network, or other machine learning model, that generates a predicted class of the content, such as an image, in a target domain from features extracted from the content by the classification model. The classification model may be any machine learning model, such as a neural network, boosted tree, gradient boosted tree or random forest model in various embodiments. Alternatively, the online concierge system disregards the output of the domain classifier layers of the classification model after the classification model has been trained, subsequently using an output of the class predictor when the trained classification model is applied to content, such as an image. Additionally, outputs from the feature extractor may be stored in association with content to which the trained classification model is applied, allowing the online concierge system to maintain features of the content to which the classification model is applied.

Subsequently, the online concierge system applies the trained classification model, comprising the stored feature extractor layers and class predictor layers, to a selected image, such as an image obtained from a warehouse or from another source. The trained classification model outputs a class in the target domain for the selected image and the online concierge system stores the class in the target domain in association with the selected image. In some embodiments, the online concierge system also stores features extracted from the selected image by the trained classification model in association with the selected image. Leveraging training data labeled with different classes from a source domain allows the online concierge system to more efficiently train the classification model, reducing resources allocated to generating the training data and an amount of time to train the classification model.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
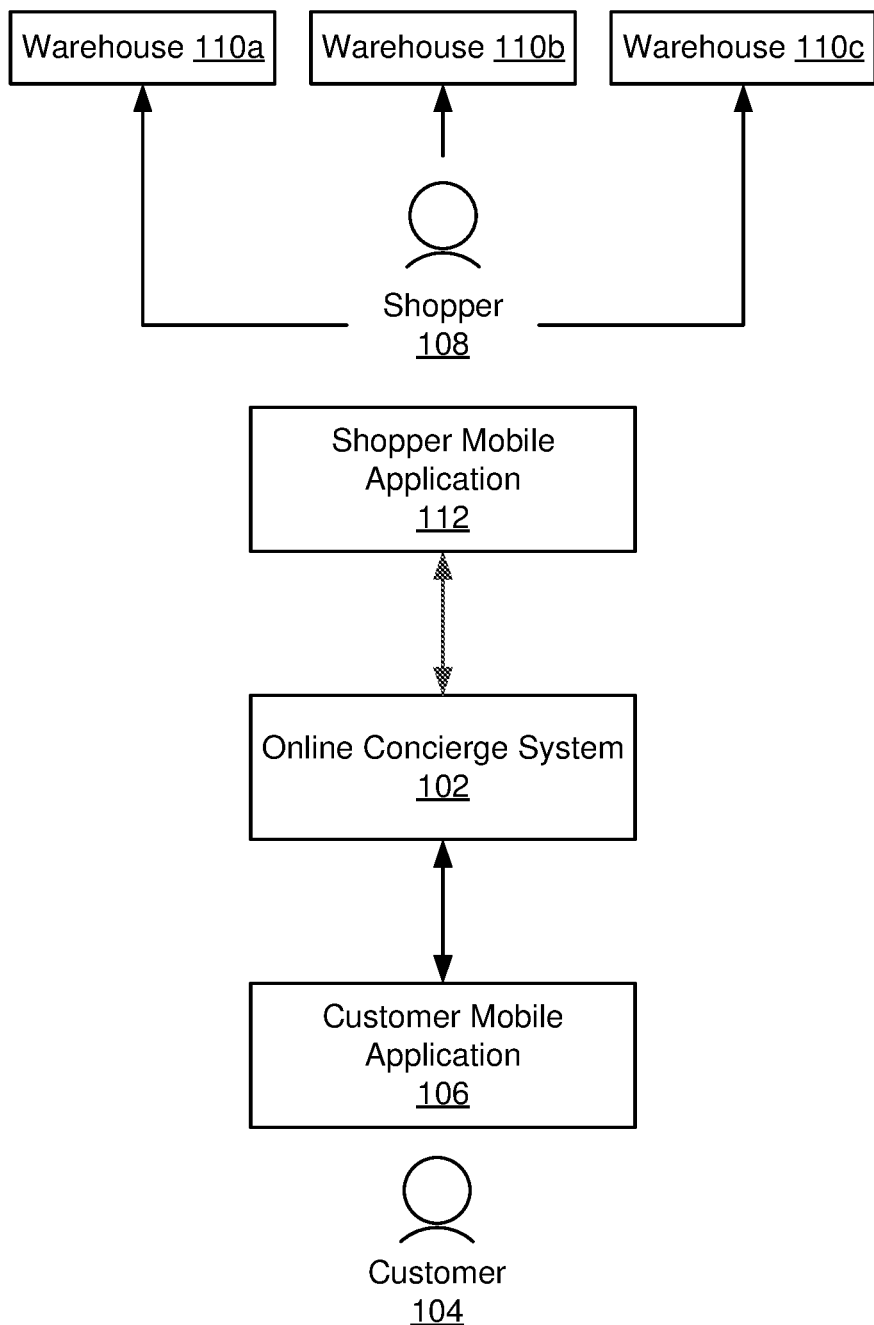
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
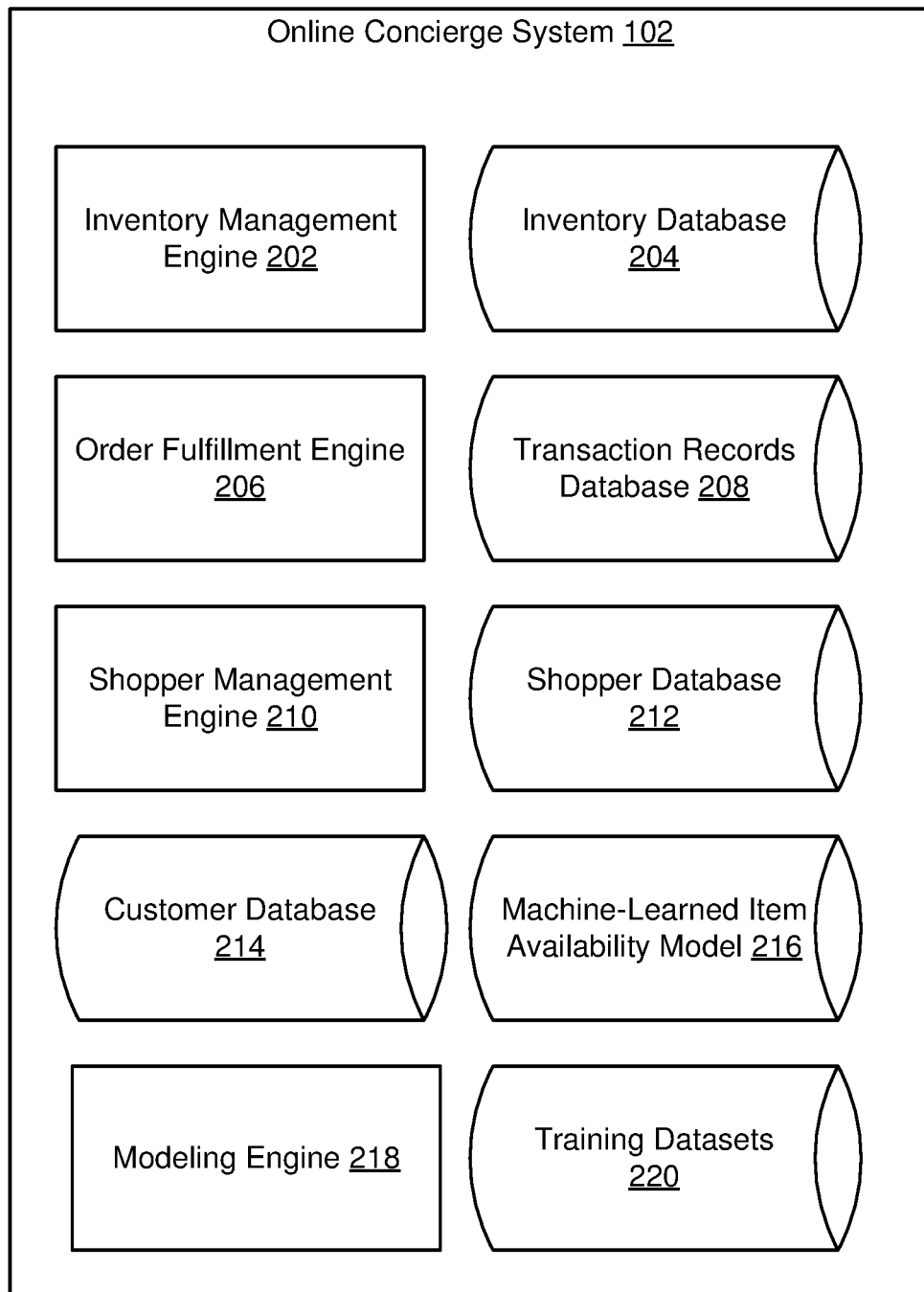
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 generates an estimated time of arrival for an order received from a user, allowing the estimated time of arrival to be displayed in an interface in conjunction with information identifying the order. An option to select the order for short-term fulfillment by the estimated time of arrival is also displayed in the interface, allowing the user to account for the estimated time of arrival when determining whether to select the order for short-term fulfillment. As further described below in conjunction with FIGS. 5-7, the order fulfillment engine accounts for a predicted delivery time for an order from characteristics of the order, as well a policy optimization model trained to determine a modification to the predicted delivery time to optimize a probability of an order being fulfilled after a combination of the modification to the predicted delivery time and a wait time for users from receipt of an order from the user by the online concierge system to fulfillment of the order. As further described below in conjunction with FIGS. 5-7, modifying the predicted delivery time by the modification from the predicted delivery time allows the order fulfillment engine 206 to display an estimated time of arrival for an order that minimizes a wait time for order fulfillment while reducing a probability of the order being fulfilled after a time identified to the user by the order fulfillment engine 206.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained classification model, further described below in conjunction with FIGS. 4 and 5. The classification model receives content, such as an image, as an input and outputs a class maintained by the online concierge system 102 for the image. To train the classification model, the modeling engine 218 obtains training data from a source domain. The training data includes examples, such as images, labeled with a class maintained by the source domain, with the classes maintained by the source domain differing from the classes maintained by the online concierge system 102. As further described below in conjunction with FIG. 4, the modeling engine 218 maps one or more classes from the source domain to each class maintained by the online concierge system 102. In various embodiments, the modeling engine 218 generates a source embedding for each class in the source domain and generates a target embedding for each class maintained by the online concierge system 102. For each class maintained by the online concierge system 102, the modeling engine 218 selects one or more corresponding classes maintained by the source domain from measures of similarity between a target embedding for the class maintained by the online concierge system 102 and source embeddings for the classes maintained by the online concierge system 102.

From examples from the training data labeled with classes corresponding to a class maintained by the online concierge system 102, the modeling engine 218 generates a source domain training set including examples to which a class label corresponding to the class maintained by the online concierge system 102 is applied. Additionally, the modeling engine 218 retrieves additional examples maintained by the online concierge system 102 to obtain a second training set including the additional examples and examples from the source domain training set and applies a domain label to the examples of the second training set, with the domain label identifying a domain from which an example was obtained. The classification model outputs a predicted class maintained by the online concierge system 102 for content, such as an image, and a predicted domain for the content, such as the image. As further described below in conjunction with FIGS. 4 and 5, when training the classification model, the modeling engine 218 multiplies error terms from layers corresponding to the domain classification by a negative constant when backpropagating the error terms, allowing the classification model to better identify features of content that are domain-invariant to improve prediction of a class maintained by the online concierge system 102 for content.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders.

The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
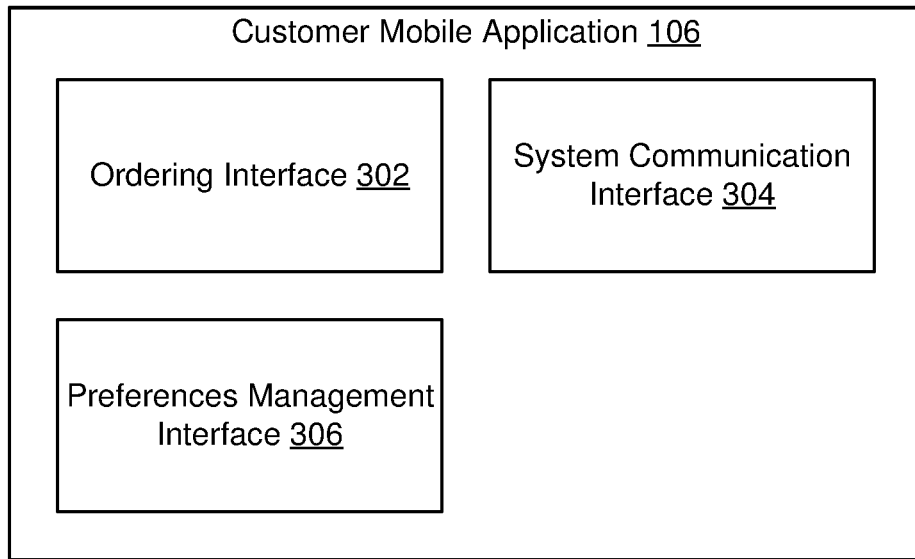
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
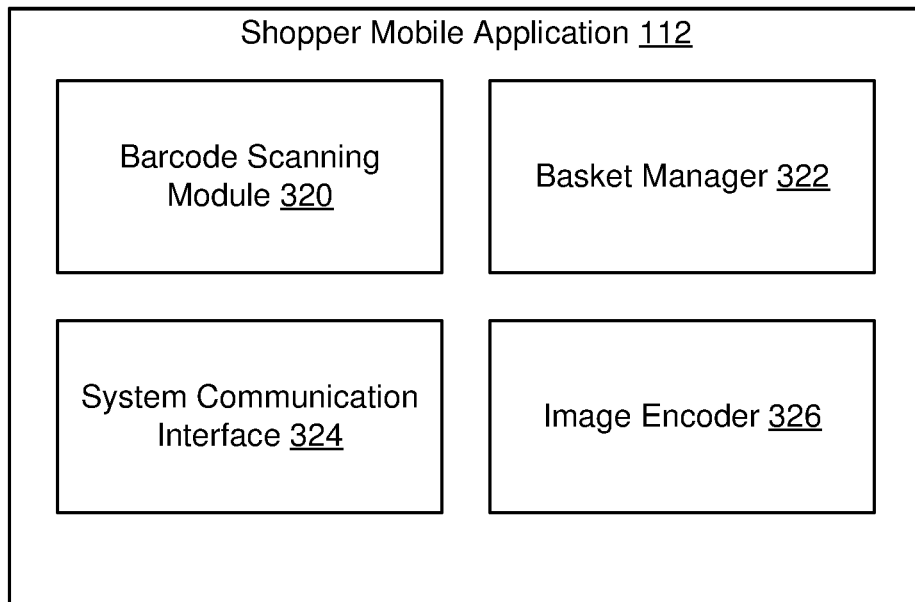
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
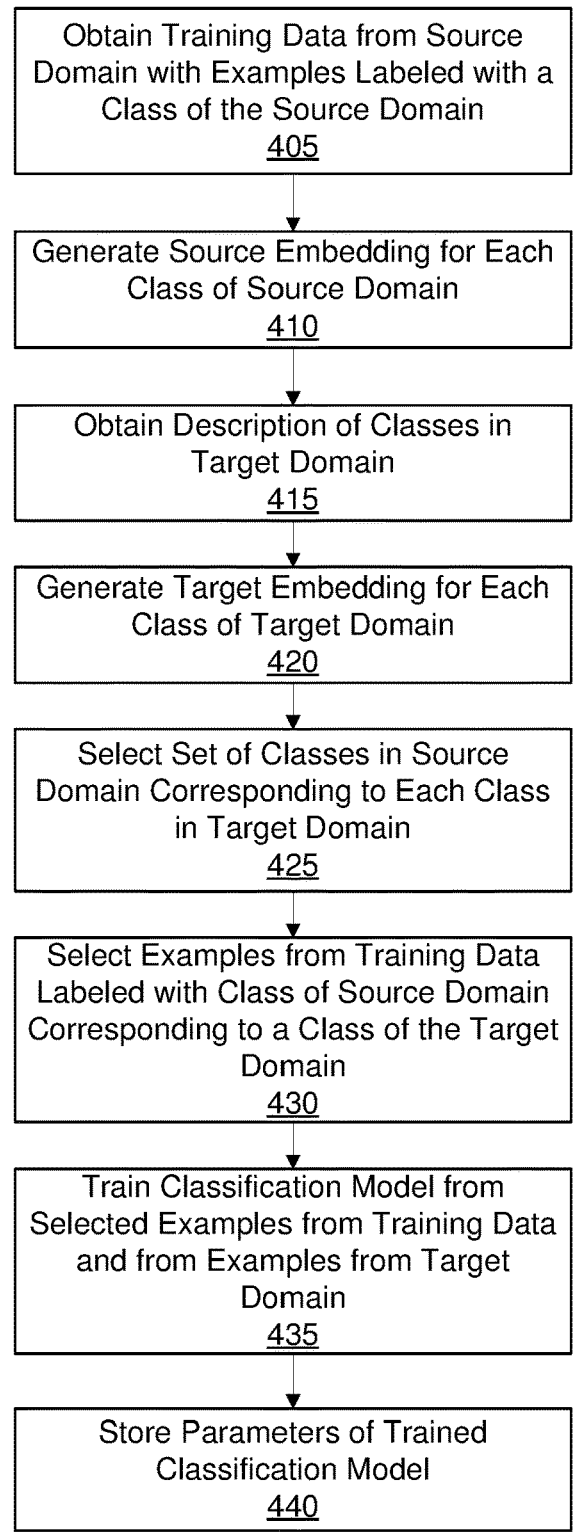
FIG. 4 is a flowchart of a method for training a classification model using training data labeled with different classes than an output of the classification model, according to one embodiment.

Training a Classification Model from Training Data Labeled with Different Classes FIG. 4 is a flowchart of one embodiment of a method for training a classification model using training data labeled with different classes than an output of the classification model. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments. While FIG. 4 describes the steps of the method as performed by an online concierge system 102, the steps of the method may be performed by any online system in various embodiments.

The online concierge system 102 obtains 405 training data from a source domain that includes a set of examples, with a label corresponding to a class in the source domain applied to each example of the set of training data. In various embodiments, the set of training data includes a plurality of images, with a label identifying a class in the source domain applied to each image. Hence, the examples of the training data comprise images each labeled with a corresponding class from the source domain. The label applied to an example of the training data is text data, such as a name or a description of a class, in various embodiments.

The online concierge system 102 generates 410 a source embedding for each class of the source domain, creating a semantic representation of each class of the source domain. In some embodiments, the online concierge system 102 generates 410 an embedding for each class of the source domain. The source embedding for a class or the source s represents the class in a multidimensional space in various embodiments. To generate 410 the source embedding for a class of the source domain, the online concierge system 102 applies a method, such as word2vec or GloVe, to text data corresponding to a class of the source domain, generating 420 the source embedding corresponding to the class of the source domain.

Additionally, the online concierge system 102 obtains 415 a description of each class of a target domain, with the classes in the target domain are different from the classes of the source domain. In various embodiments, the classes of target domain do not overlap with the classes of the source domain. The target domain includes the classes to be output by a trained classification model subsequently applied by the online concierge system 102. A description of a class of the target domain is a textual description of the class or other text describing the class in various embodiments. For example, a description of a class in the target domain comprises a set of keywords corresponding to the class in the target domain.

For each class in the target domain, the online concierge system 102 generates 420 a target embedding from the description of a class in the target domain from the description of the class in the target domain. The target embedding for the class in the target domain represents the target class in a multidimensional space in various embodiments. The target embeddings for classes in the target domain and the source embeddings for the classes of the source domain, are in a common latent space (e.g., the source embeddings and the target embeddings have an equal number of dimensions). In various embodiments, the online concierge system 102 applies a method, such as word2vec or GloVe, to a description, such as text data, describing a class in the target domain to generate 420 a target embedding for the class in the target domain.

For each class in the target domain, the online concierge system 102 selects 425 a corresponding set of classes in the source domain based on similarities between the class in the target domain and classes in the source domain. In various embodiments, the online concierge system 102 determines a measure of similarity between a target embedding for the class in the target domain and source embeddings and selects 425 classes of the source domain based on the measures of similarities. For example, the online concierge system 102 selects 425 classes in the source domain having at least a threshold measure of similarity to the class in the target domain. As another example, the online concierge system 102 ranks classes in the source domain based on corresponding measures of similarity to the class of the target domain and selects 425 classes in the source domain having at least a threshold position in the ranking. Example measures of similarity between a source embedding and a target embedding include a cosine similarity between the source embedding and the target embedding, a Euclidian distance between the source embedding and the target embedding, a dot product between the source embedding and the target embedding, or any other suitable metric. This allows the online concierge system 102 to select 425 a set of classes in the source domain that correspond to a class in the target domain.

From the training data including examples labeled with a class from the source domain, the online concierge system 102 selects 430 examples from the training data having labels matching a class of the source domain included in a selected set of classes of the source domain. Using the selected set of classes of the source domain allows the examples selected 430 from the training data to have labels that correspond to a class in the target domain. In various embodiments, the online concierge system 102 identifies each class of the target domain and selects 430 examples of the training data having a class of the source domain matching a set of classes in the source domain selected 425 as corresponding to an identified class of the target domain, allowing the online concierge system 102 to select 430 examples of the training data corresponding to different classes of the target domain.

The online concierge system 102 generates a source domain training set that includes the examples selected 430 from the training data that have a class of the source domain matching at least one or the set of classes in the source domain corresponding to a class in the target domain. An example of the source domain training set includes the example of the training data from the source domain with a class label applied that identifies a class in the target domain corresponding to the class of the example in the source domain and a domain label indicating a domain from which the example was obtained. Hence, the source domain training set leverages the labels for examples indicating a class in the source domain for an example and the correspondences between classes in the target domain and classes in the source domain to generate examples of content, such as images, labeled with a corresponding class in the target domain and with a domain from which the example was obtained. Hence, the selection of classes of the source domain corresponding to classes of the target domain allows the online concierge system 102 to leverage existing training data that labels images or other content with a class in the source domain into the source domain training set that applies class labels identifying classes in the target domain for various examples of training data from the source domain.

However, examples of the source domain training set, which are examples selected 430 from the training data with labels in the source domain corresponding to a label in the target domain may be insufficient to generalize to content from the target domain. For example, the training data from the source dimension includes various images and other images are included in the target domain, and differences in characteristics of the selected images and characteristics of images in the target domain may limit accuracy of a classification model for the target domain trained from the selected examples from the training set. The online concierge system 102 trains 435 the classification model as a domain adaptive network by applying the classification model to the examples in the target domain training data to allow the classification model to allow characteristics from the labeled examples selected 430 from the target domain training data to be adaptable to content from the target domain.

To train 435 the classification model, the online concierge system 102 obtains a second training set including examples of the source domain training set and additional examples comprising images from both the source domain and the target domain. A domain label indicating whether an additional example of the second training set is from the source domain or is from the target domain is applied to each additional example of the second training set. The classification model is applied to an additional example of the second training set, where a feature extractor extracts features of the example through a neural network or other machine learning model. In various embodiments, a feature vector describing various characteristics or attributes of the additional example is extracted by the neural network or other machine learning model. Features extracted from an additional example are input to a domain classifier that is coupled to the feature extractor through a gradient reversal layer. The domain classifier outputs a predicted domain for the additional example of the second training set that indicates whether the additional example of the second training set is from the source domain or is from the target domain.

For an additional example of the second training set, application of the classification model to the example of the second training set results in a predicted domain for the additional example. For the domain classifier of the classification model, the online concierge system 102 determines an error term from a difference between the domain label applied to the example of the second training set. The error term may be generated through any suitable loss function, or combination of loss functions, in various embodiments. For example, the loss function is a cross entropy loss between a predicted domain of the additional example of the second training set and a domain label applied to the corresponding additional example of the second training set. However, in other embodiments, any loss function or combination of loss functions, may be applied to the predicted domain of the additional example of the second training set to the corresponding domain label of the additional example of the second training set to generate the error term. Such a loss term allows the classification model to be trained to minimize a distributional distance between the additional examples from the source domain and from the target domain.

The online concierge system 102 backpropagates the one or more error terms from the domain label applied to an additional example of the second training set and the predicted domain of the additional example of the second training set through layers of a network comprising the domain classifier and comprising the feature extractor. Backpropagation of the error term from a layer of the network comprising domain classifier to a layer of the network comprising the feature extractor through the gradient reversal layer multiplies the error term by a negative constant (e.g., negative one), so a negative of the error term is backpropagated through layers of the feature extractor. One or more parameters of the network comprising the domain classifier and comprising the feature extractor are modified through any suitable technique from the backpropagation of the one or more error terms, and of one or more error terms multiplied by the negative constant, through the layers of the network comprising the domain classifier and comprising the feature extractor. For example, weights between nodes of the network comprising the feature extractor or between nodes of the network comprising the domain classifier, such as nodes in different layers of the network comprising the feature extractor or comprising the domain classifier, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

Similarly, for examples of the source domain training set, application of the classification model to the example of the source domain training set results in a predicted domain for the example of source domain training set and a predicted class of the target domain for the example. For the class predictor of the classification model, the online concierge system 102 determines an error term from a difference between the class label applied to the example of the source domain training set and the predicted class of the target domain of the example of the source domain training set. As further described above, an example of the source domain training set is labeled with one or more classes of the source domain, from which a label identifying a corresponding class in the target domain is determined and applied to the example of the source domain training set. The error term may be generated through any suitable loss function, or combination of loss functions, in various embodiments. For example, the loss function is a cross entropy loss between a predicted class of the target domain for the example of the source domain training set and a class label applied to the corresponding example of the source domain training set. However, in other embodiments, any loss function or combination of loss functions, may be applied to the predicted class of the target domain for the example of the source domain training set and the class label applied to the corresponding example of the source domain training set to generate the error term.

The online concierge system 102 backpropagates the one or more error terms from the class label applied to an example of the source domain training set and the predicted class of the target domain for the example of the source domain training set through layers of the network comprising the class predictor and comprising the feature extractor. One or more parameters of the network comprising the class predictor and comprising the feature extractor are modified through any suitable technique from the backpropagation of the one or more error terms through the layers of the network comprising the class predictor and comprising the feature extractor. For example, weights between nodes of the network comprising the feature extractor or between nodes of the network comprising the class predictor, such as nodes in different layers of the network comprising the feature extractor or comprising the class predictor, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network comprising the feature extractor and through layers of the network comprising the class predictor is stopped. In some embodiments, the online concierge system 102 uses gradient descent or any other suitable process to minimize the one or more error terms in various embodiments.

Figure 5:
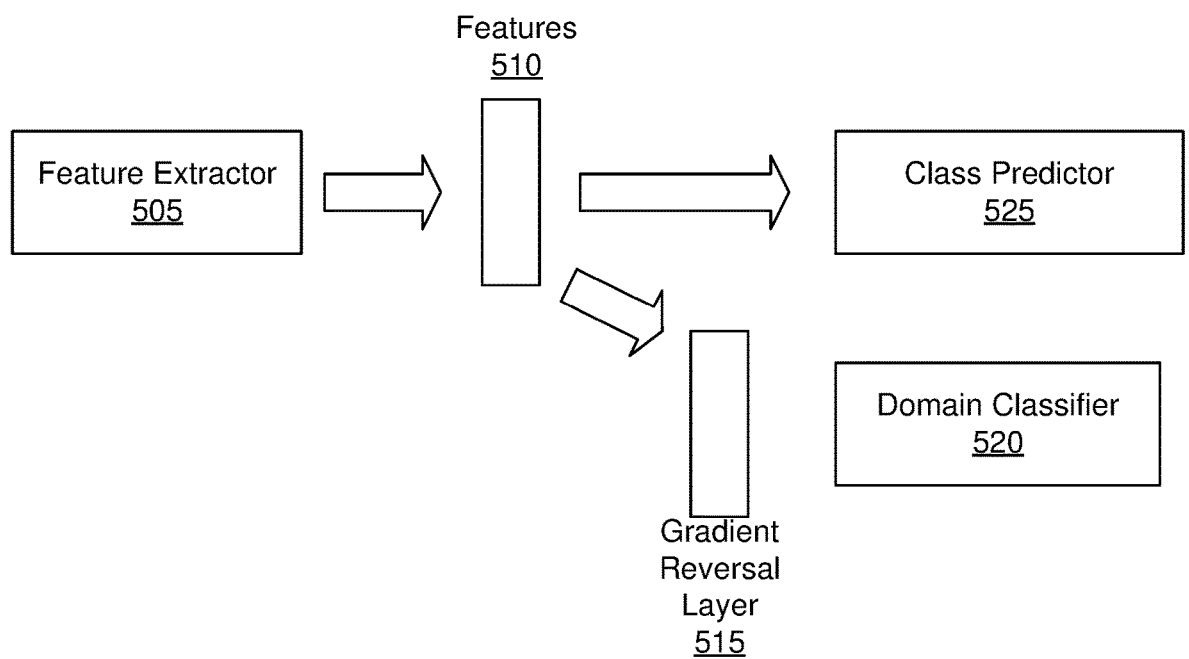
FIG. 5 is a conceptual diagram of one embodiment of the classification model, according to one embodiment.

FIG. 5 is a conceptual diagram of one embodiment of the classification model 500. In the embodiment shown by FIG. 5, the classification model 500 includes layers comprising a feature extractor 505, which receives an image or other content as an input and extracts a set of features 510 from the image. In various embodiments, the features 510 extracted by the feature extractor 505 comprise an embedding or a vector describing the image or other content input to the feature extractor 505. The online concierge system 102 stores the features 510 in association with the image or other content in various embodiments, allowing the online concierge system 102 to maintain a representation of the image or other content generated by the classification model 500.

The features 510 generated from the feature extractor 505 are input to a domain classifier 520 and pass through a gradient reversal layer 515 that couples the feature extractor 505 to the domain classifier 520. During forward propagation of data through the classification model 500 (i.e., propagation of the features 510 to the domain classifier 520), the gradient reversal layer 515 acts as an identity transformation and does not affect the data from the feature extractor 505 to the domain classifier 520. However, during backpropagation of a loss function, such as a gradient, through the gradient reversal layer 515 (i.e., propagation from the domain classifier 520 to the feature extractor 505), the gradient reversal layer 515 multiplies the loss function, or other data, by a negative constant. The gradient reversal layer 515 allows parameters of the feature extractor 505 to be modified during training of the classification model 500 so that distributions of features 510 extracted by the feature extractor 505 for images or other content from different domains are made as indistinguishable as possible by the domain classifier 520. Hence, the gradient reversal layer 515 allows the feature extractor to be trained from output of the domain classifier 520 to extract features 510 from images or other content that are domain-invariant, preventing the features 510 extracted by the feature extractor 505 from being biased towards features of images or content from a particular domain. Inclusion of the gradient reversal layer 515 between the feature extractor 505 and the domain classifier 520 allows the feature extractor 505 to be trained to extract features that are invariant across different domains and also discriminative for identifying distinct images or other content.

The domain classifier 520 outputs a predicted domain from which an image or other content was obtained from the features 510 extracted by the feature extractor 505. As further described above in conjunction with FIG. 4, the classification model 500 receives images, or other content, from a source domain or from a target domain as input. From the features 510 that the feature extractor 505 extracts from an image, or other content, the domain classifier 520 outputs a predicted domain of the image or other content.

Additionally, the classification model 500 inputs the features 510 extracted by the feature extractor 505 to a class predictor 525. As further described above in conjunction with FIG. 4, the class predictor 525 outputs a predicted class in a target domain for an image or other content that was input into the feature extractor 505. In various embodiments, after the classification model 500 has been trained, as further described above in conjunction with FIG. 4, the output of the class predictor 525 is used as the output of the classification model 500, with the output of the domain classifier 520 discarded, allowing the classification model 500 to output a class in a target domain for an image or other content input to the classification model 500. The online concierge system 102 may also store features 510 extracted for the image or other content in association with the image or other content, allowing the classification model 500 to both determine the predicted class in the target domain for the image or other content and to generate features 510 for the image or other content. While FIG. 5 shows an example classification model 500 comprising a domain adaptive network, in other embodiments, the classification model 500 has any suitable architecture and is trained to minimize a distance between examples from the source domain and examples from the target domain.

Referring back to FIG. 4, in response to the one or more loss functions satisfying the one or more criteria and the online concierge system 102 stopping the backpropagation of the one or more error terms, the online concierge system 102 stores 440 the set of parameters for the layers of the network comprising the feature extractor and the class predictor. For example, the online concierge system 102 stores the weights of connections between nodes in the networks comprising the feature extractor and the class predictor as parameters of the classification model in a non-transitory computer readable storage medium. Hence, training of the classification model allows the online concierge system 102 to generate and to store a neural network, or other machine learning model, that generates a predicted domain of content, such an image, and a predicted class of the content, such as the image, in a target domain from features extracted from the content by the classification model. The classification model may be any machine learning model, such as a neural network, boosted tree, gradient boosted tree or random forest model in various embodiments. In various embodiments, the online concierge system 102 also stores the domain classifier but disregards the output of the domain classifier layers of the classification model after the classification model has been trained 435, subsequently using an output of the class predictor when the trained classification model is applied to content, such as an image. Additionally, outputs from the feature extractor may be stored in association with content to which the trained classification model is applied, allowing the online concierge system 102 to maintain features of the content to which the classification model is applied.

Subsequently, the online concierge system 102 applies the trained classification model to a selected image, such as an image obtained from a warehouse 110 or from another source. The trained classification model outputs a class in the target domain for the selected image and the online concierge system 102 stores the class in the target domain in association with the selected image. In some embodiments, the online concierge system 102 also stores features extracted from the selected image by the trained classification model in association with the selected image. Leveraging training data labeled with different classes from a source domain allows the online concierge system 102 to more efficiently train 435 the classification model, reducing resources allocated to generating the training data and an amount of time to train 435 the classification model.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A classification model stored on a non-transitory computer readable storage medium, wherein the classification model is manufactured by a process comprising:
   obtaining training data from a source domain, the training data comprising a plurality of examples, each example comprising an image with a label applied to each example identifying a class in the source domain for the example;
   for each class in a target domain, selecting a set of classes in the source domain corresponding to a class in the target domain, classes in the target domain different from classes in the source domain;
   generate a source domain training set comprising examples of the training data from the source domain, each example of the source domain training set comprising an image with a class label identifying the class in the target domain corresponding to the class in the source domain for the example;
obtaining a second training set comprising one or more additional examples comprising an image from the target domain or an image from the source domain with a domain label identifying a domain of an additional example;
initializing a plurality of layers of a neural network, the plurality of layers including feature extractor layers configured to output a set of features that are input into each of a domain classifier set of layers and a class predictor set of layers and a gradient reversal layer coupling the feature extractor to the domain classifier, the gradient reversal layer configured to multiply data backpropagated from the domain classifier by a negative constant;
training the classification model by backpropagating by:
selecting the class predictor set of layers or the domain classifier set of layers;
responsive to selecting the class predictor set of layers, selecting an example from the source domain training set and backpropagating through the class predictor set of layers and feature extractor layers of the model using a loss function based on matching output of the class predictor to the class label of the selected example;
responsive to selecting the domain classifier set of layers, selecting an additional example from the second training set and backpropagating through the domain classifier set of layers, gradient reversal layer, and feature extractor layers of the model using a loss function based on matching output of the domain classifier to the domain label of the additional example;
stopping the backpropagating when one or more criteria are met; and
storing a set of parameters of the feature extractor layers and the class predictor set of layers of the network on the computer readable storage medium as parameters of the classification model.

2. The method of claim 1, wherein selecting the set of classes in the source domain corresponding to the class in the target domain comprises:
generating an embedding of each class in the source domain;
generating an embedding of the class in the target domain;
selecting the set of classes in the source domain based on measures of similarity between the embedding of the class in the target domain and embeddings of classes in the source domain.

3. The method of claim 2, wherein selecting the set of classes in the source domain based on measures of similarity between the embedding of the class in the target domain and embeddings of classes in the source domain comprises:
ranking the classes in the source domain based on the measures of similarity between the embedding of the class in the target domain and the embeddings of the classes in the source domain; and
selecting classes in the source domain having at least a threshold position in the ranking.

4. The method of claim 2, wherein selecting the set of classes in the source domain based on measures of similarity between the embedding of the class in the target domain and embeddings of classes in the source domain comprises:

selecting classes in the source domain having at least a threshold measure of similarity to the class in the target domain.

5. The method of claim 2, wherein a measure of similarity between the embedding of the class in the target domain and an embedding of a class in the source domain comprises a cosine similarity between the embedding of the class in the target domain and the embedding of the class in the source domain.

6. A computer program product comprising a non-transitory computer readable storage medium having instructions encoded thereon that, when executed by a processor, cause the processor to:
obtain training data from a source domain, the training data comprising a plurality of examples, each example comprising an image with a label applied to each example identifying a class in the source domain for the example;
obtain a description of classes in a target domain different than the source domain, the classes in the target domain different from classes in the source domain;
for each class in the target domain, select a set of classes in the source domain corresponding to the class in the target domain;
generate a source domain training set comprising examples of the training data from the source domain, each example of the source domain training set comprising an image with a class label identifying the class in the target domain corresponding to the class in the source domain for the example;
obtaining a second training set comprising one or more additional examples comprising an image from the target domain or an image from the source domain with a domain label identifying a domain of an additional example;
training a classification model comprising a domain adversarial neural network configured to output a predicted class in the target domain for an input image by:
applying the classification model to examples of the source domain training set and modifying one or more parameters of the classification based on backpropagation of an error term from a difference between a predicted class in the target domain for an example of the source domain training set and a class label for the example of the source domain training set until the error term satisfies one or more conditions; and
applying the classification model to examples of the second training set to which the domain label is applied and modifying one or more parameters of the classification based on backpropagation of a domain error term from a difference between a predicted domain of the example of the second training set and the domain label applied to the example of the second training set satisfies one or more conditions;
apply the trained classification model to a selected image; and
store a predicted class in the target domain for the selected image output by the trained classification model in association with the selected image.

7. The computer program product of claim 6, wherein select the set of classes in the source domain corresponding to the class in the target domain comprises:
generate an embedding of each class in the source domain;
generate an embedding of the class in the target domain;

select the set of classes in the source domain based on measures of similarity between the embedding of the class in the target domain and embeddings of classes in the source domain.

8. The computer program product of claim 7, wherein select the set of classes in the source domain based on measures of similarity between the embedding of the class in the target domain and embeddings of classes in the source domain comprises:

rank the classes in the source domain based on the measures of similarity between the embedding of the class in the target domain and the embeddings of the classes in the source domain; and select classes in the source domain having at least a threshold position in the ranking.

9. The computer program product of claim 7, wherein select the set of classes in the source domain based on measures of similarity between the embedding of the class in the target domain and embeddings of classes in the source domain comprises:

select classes in the source domain having at least a threshold measure of similarity to the class in the target domain.

10. The computer program product of claim 7, wherein a measure of similarity between the embedding of the class in the target domain and an embedding of a class in the source domain comprises a cosine similarity between the embedding of the class in the target domain and the embedding of the class in the source domain.

11. The computer program product of claim 7, wherein the trained classification model is further configured to output a set of features extracted from the input image.

12. The computer program product of claim 11, wherein the set of features comprises a feature vector.

13. The computer program product of claim 11, wherein the non-transitory computer readable storage medium further has instructions encoded thereon that, when executed by the processor, cause the processor to:

store a set of features extracted from the selected image by application of the trained classification model to the selected image.

* * * * *